(12) United States Patent
Bramer et al.

(10) Patent No.: US 8,448,964 B2
(45) Date of Patent: May 28, 2013

(54) HINGING ARRANGEMENT FOR A WHEEL AXLE SUSPENSION

(75) Inventors: Hans Bramer, Eerbeek (NL); Derk Geert Aalderink, Laren (NL)

(73) Assignee: VDL Weweler B.V., Apeldoorn (NL)

( * ) Notice: Subject to any disclaimer, the term of this patent is extended or adjusted under 35 U.S.C. 154(b) by 170 days.

(21) Appl. No.: 12/935,050

(22) PCT Filed: Mar. 6, 2009

(86) PCT No.: PCT/NL2009/000054
§ 371 (c)(1),
(2), (4) Date: Oct. 14, 2010

(87) PCT Pub. No.: WO2009/123437
PCT Pub. Date: Oct. 8, 2009

(65) Prior Publication Data
US 2011/0018217 A1    Jan. 27, 2011

(30) Foreign Application Priority Data

Mar. 31, 2008  (EP) ..................................... 08075231

(51) Int. Cl.
*B60G 7/00* (2006.01)
(52) U.S. Cl.
USPC .......... 280/124.116; 280/124.1; 280/124.128; 403/150; 403/156; 384/215; 384/220
(58) Field of Classification Search
USPC ......... 280/124.1, 124.116, 124.134, 124.128, 280/124.175; 403/150, 156, 203, 220–228; 384/215, 220; 267/220, 270
See application file for complete search history.

(56) References Cited

U.S. PATENT DOCUMENTS

| 1,931,945 A | 10/1933 | Zerk |
| 2,308,967 A | 1/1943 | Kuss |

(Continued)

FOREIGN PATENT DOCUMENTS

| DE | 23979 | 10/1962 |
| EP | 0 504 593 A1 | 9/1992 |

(Continued)

OTHER PUBLICATIONS

English translation of Publication No. DE 23979.

(Continued)

*Primary Examiner* — Paul N Dickson
*Assistant Examiner* — George Spisich
(74) *Attorney, Agent, or Firm* — Hoffmann & Baron, LLP

(57) ABSTRACT

A hinging arrangement for a wheel axle suspension of a vehicle, comprises an attachment eye fixed to a component to be hingedly attached to the vehicle, and a hinge pin, e.g. a hinge bolt, attached to a fixed vehicle component. The hinge pin is extending through the attachment eye, wherein the attachment eye has a bore for the hinge pin which comprises at least one tapering bore portion. The arrangement further comprises at least one resilient ring and a clamping member each provided with a central bore for the hinge pin, wherein, in the mounted state, the resilient ring is received at least partially within said tapering bore portion. The resilient ring is bearing with one side against the tapering surface of said tapering bore portion and said clamping member is forced against the other side of the resilient ring whereby the resilient ring is compressed between the clamping member and the tapering surface of the tapering bore portion.

16 Claims, 3 Drawing Sheets

U.S. PATENT DOCUMENTS

| | | | |
|---|---|---|---|
| 2,477,447 A | | 7/1949 | Fawick |
| 2,621,949 A | | 12/1952 | Grantham |
| 2,732,267 A | * | 1/1956 | Stover .......................... 384/271 |
| 2,853,325 A | * | 9/1958 | Ward ............................ 280/682 |
| 2,900,182 A | | 8/1959 | Hinks |
| 3,493,222 A | | 2/1970 | Mathers et al. |
| 3,580,347 A | * | 5/1971 | McGee ........................... 180/22 |
| 4,175,806 A | | 11/1979 | Taylor |
| 4,595,216 A | | 6/1986 | Ware |
| 4,880,319 A | * | 11/1989 | Haggerty ....................... 384/215 |
| 4,907,814 A | * | 3/1990 | Foster ........................... 280/104 |
| 4,911,417 A | * | 3/1990 | Short ............................ 267/256 |
| 5,189,962 A | * | 3/1993 | Iwamura et al. ............ 105/218.2 |
| 5,193,787 A | | 3/1993 | Coopland, Jr. |
| 5,337,997 A | | 8/1994 | Hockney |
| 5,362,095 A | | 11/1994 | Eveley |
| 5,372,373 A | * | 12/1994 | Reel ........................ 280/124.111 |

FOREIGN PATENT DOCUMENTS

| | | |
|---|---|---|
| EP | 0 615 869 A2 | 9/1994 |
| EP | 0 943 529 A1 | 9/1999 |
| EP | 1 459 914 A1 | 9/2004 |
| EP | 1 728 654 A1 | 12/2006 |
| FR | 2 162 838 | 7/1973 |
| FR | 2 737 443 | 2/1997 |
| GB | 257 009 | 8/1926 |
| GB | 1 387 726 | 3/1975 |
| WO | 03/072377 A1 | 9/2003 |

OTHER PUBLICATIONS

English translation of Publication No. EP 0, 504, 593 A1.
English translation of Publication No. EP 0,615,869 A2.
English translation of Publication No. FR 2 162 838.
English translation of Publication No. FR 2737443.

* cited by examiner

US 8,448,964 B2

HINGING ARRANGEMENT FOR A WHEEL AXLE SUSPENSION

CROSS-REFERENCE TO RELATED APPLICATIONS

This application is the National Stage of International Application No. PCT/NL2009/000054, filed Mar. 6, 2009, which claims the benefit of European Application No. EP 08075231.4, filed Mar. 31, 2008, the contents of which is incorporated by reference herein.

FIELD OF THE INVENTION

The present invention relates to a hinging arrangement for a wheel axle suspension of a vehicle, comprising an attachment eye fixed to a component to be hingedly attached to the vehicle, and a hinge pin, e.g. a hinge bolt, attached to a fixed vehicle component, which hinge pin is extending through the attachment eye.

BACKGROUND OF THE INVENTION

Hinging arrangements are known, for instance for hingedly attaching a front end portion of a suspension arm to a bearing bracket which is attached to a vehicle chassis. The known hinging arrangements have a cylindrical metal bushing which is clamped between the side plates of the bearing bracket. Surrounding the metal bushing is arranged a cylindrical rubber bushing which engages the inner side of the attachment eye and allows a rotational movement of the suspension arm around the hinging pin.

SUMMARY OF THE INVENTION

The invention has for an object to provide an alternative hinging arrangement for a wheel axle suspension.

This object is achieved by a hinging arrangement for a wheel axle suspension of a vehicle, comprising an attachment eye fixed to a component to be hingedly attached to the vehicle, and a hinge pin, e.g. a hinge bolt, attached to a fixed vehicle component, which hinge pin is extending through the attachment eye, wherein the attachment eye has a bore for the hinge pin which comprises at least one tapering bore portion, the arrangement further comprising at least one resilient ring and a clamping member each provided with a central bore for the hinge pin, wherein, in the mounted state, the resilient ring is received at least partially within said tapering bore portion, said resilient ring bearing with one side against the tapering surface of said tapering bore portion and said clamping member is forced against the other side of the resilient ring whereby the resilient ring is compressed between the clamping member and the tapering surface of the tapering bore portion.

With "tapering bore portion" as meant in this application is meant a bore portion having a first end and a second end, wherein the bore at the first end has a larger diameter than at the second end, and wherein the diameter of the bore portion is continuously decreasing from the first end towards the second end. This tapering shape could be a conical shape, but could also be a spherical shape.

The hinging arrangement according to the invention can advantageously be incorporated in a suspension for a vehicle, comprising a longitudinal suspension arm to which the axle is fixed, a bearing bracket fixed to the vehicle chassis and an air spring bearing against the vehicle chassis, wherein the suspension arm, seen in the driving direction of the vehicle, on its rear end is attached to the air spring and on its front end is hingedly attached to the bearing bracket. Often the suspension arm is a resilient member. The hinging arrangement according to the invention is then able to support the suspension arm in all directions. The hinging arrangement absorbs forces in rotation direction by a hinging action, which hinging action is due to springing action of the suspension arm. Furthermore, the hinging arrangement is able to absorb forces in transverse direction, horizontal forces due to braking action on the wheels of the vehicle, and vertical direction which are due to loads on the axle and roll movements. Also occurs an absorbtion of torsion, which is due to roll movement of the vehicle.

An advantage is that due to the tapering shape the eye can be made by forging more easily without the need to machine the eye afterwards in order to calibrate the bore.

Preferred embodiments of the invention are defined in the dependent claims.

The invention will be explained in more detail in the following description of preferred embodiments with reference to the drawings.

DETAILED DESCRIPTION OF THE INVENTION

Figure 1:
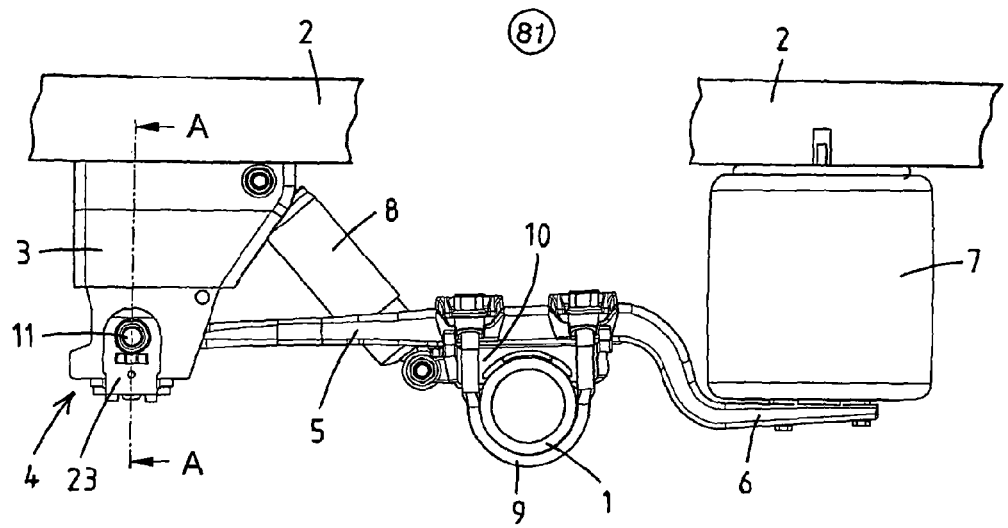
FIG. 1 shows a side view of a preferred wheel axle suspension of a vehicle according to the invention, with a typical suspension arm.

FIG. 1 shows one side of a wheel axle suspension of a vehicle, e.g. of a trailer. The wheel axle 1, on which one or more wheels are arranged at both ends, is illustrated as a hollow round axle. However, the wheel axle 1 may also be square or have some other cross section.

The wheel axle suspension shown in FIG. 1 comprises a carrying bracket 3 which is attached to the chassis of a vehicle, which is illustrated highly diagrammatically in FIG. 1 and indicated by the reference numeral 2. A suspension arm 5, which extends in the longitudinal direction of the vehicle, is hingedly attached to the carrying bracket 3 by a hinging arrangement 4. A pneumatic spring 7 is arranged between the free rear end portion 6 of the suspension arm 5, situated at a distance from the hinging arrangement 4, and the chassis 2. A shock absorber 8 fitted between the carrying bracket 3 and the suspension arm 5. The wheel axle 1 is fixed to the suspension arm 5 in a manner known per se, by means of an axle pad 10 arranged against the suspension arm 5 and forming a seat for the axle 1 and U-shaped bolts 9, with which the suspension arm 5, the axle pad 10 and the axle 1 are clamped together.

It is noted that the configuration of the wheel axle suspension as shown in FIG. 1 and the shape of the particular components 1-10 therein is to be considered an example only. Many other configurations and shapes are conceivable within the scope of the invention.

Figure 2:
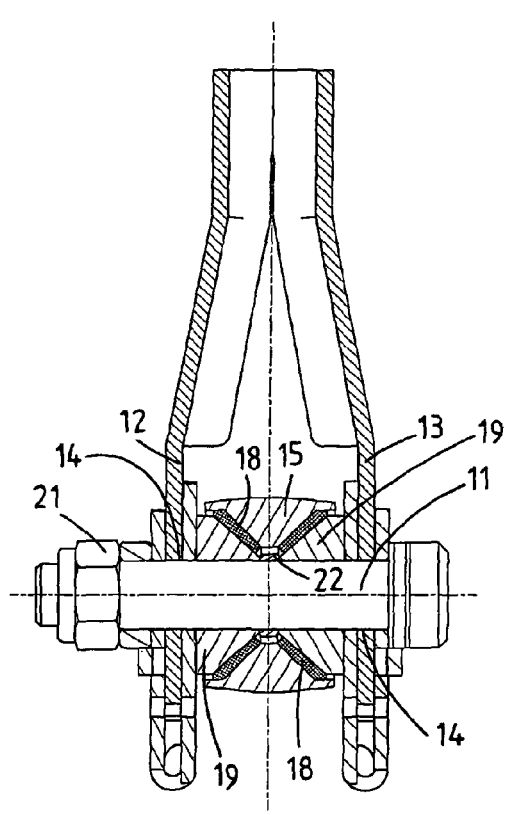
FIG. 2 shows a sectional view of a hinging arrangement of the suspension arm according to the section A-A as indicated in FIG. 1.
Figure 3:
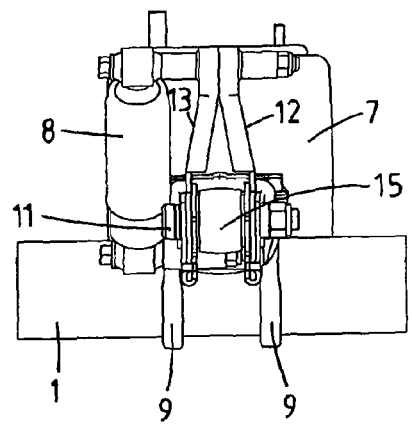
FIG. 3 shows a front view of the wheel axle suspension of FIG. 1.

The suspension arm 5 is fastened to the support bracket 3 by means of a hinging bolt 11. In the embodiment illustrated. As is also shown in FIGS. 2 and 3, the support bracket 3 comprises two side plates 12 and 13, and the support bracket 3 is open towards the rear, as seen in the direction of travel. The hinging bolt 11 extends in the transverse direction through the support bracket 3 and fits through holes 14 in the side plates 11 and 12 of the support bracket 3. The holes 14 are designed as slots which extend substantially in the direction of the longitudinal suspension arm 5, such that the hinge bolt position can be adjusted and the suspension arms supporting the same axle can be aligned.

Figure 4:
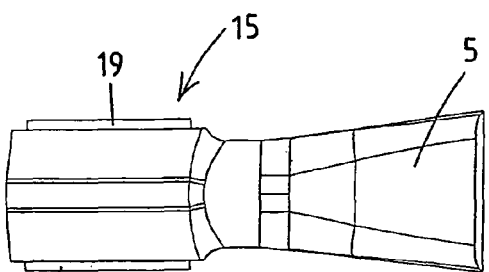
FIG. 4 shows a top view of the front end portion of the suspension arm of FIG. 1.
Figure 5:
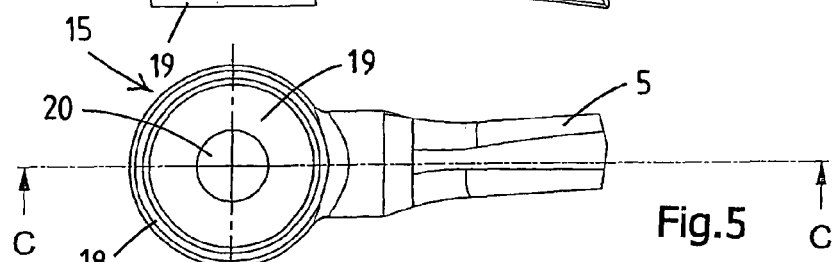
FIG. 5 shows a side view of the front end portion of the suspension arm of FIG. 1.
Figure 6:
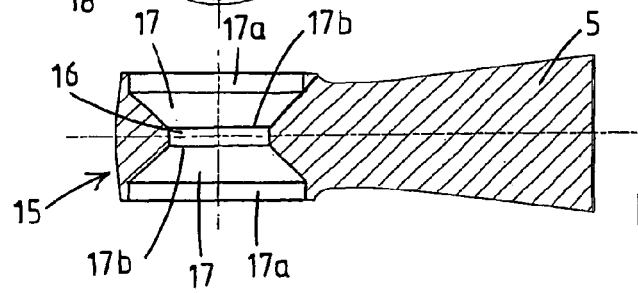
FIG. 6 shows a sectional view according to the section line C-C as indicated in FIG. 5.

The suspension arm 5 is provided on its front end portion with an attachment eye 15, which is shown in more detail in FIGS. 4-6. As can be seen particularly well in FIG. 6, the attachment eye 15 has a passage for the hinge bolt 11, said passage comprising a central bore 16 and two opposing tapering bore portions 17. The tapering bore portions 17 have an outer end 17a and an inner end 17b, wherein the outer end 17a has a larger diameter than the inner end 17b. The radially inwardly facing surface 17c of the tapering bore portion 17 is tapering from the outer end towards the inner end 17b. The diameter of the tapering bore portion 17 is thus continuously decreasing from the outer end 17a towards the inner end 17b. The central bore 16 has a constant diameter and connects the inner ends 17b of the respective tapering bore portions 17.

The hinging arrangement 4 further comprises a resilient ring 18, preferably made of rubber or another suitable elastomeric material. The rubber ring 18 is received within each of the tapering bore portions 17, as can be seen in FIG. 2. Said rubber ring 18 bears with one side against the tapering surface 17c of the tapering bore portion 17. In each of the tapering bore portions 17 is provided a conical clamping member 19. The clamping member 19 is provided with a central bore 20 for the hinge bolt 11. The clamping member 19 has a conical outer surface 19c that faces the tapering surface 17c of the tapering bore portion 17. In the mounted state, the clamping member 19 and the surface are clamped towards each other by means of the hinging bolt 11 and a nut 21, compressing between them the resilient ring 18.

The resilient ring 18, which is preferably made of rubber is preferably vulcanized on the conical surface of the clamping member 19.

In the central bore 16, between the inner ends of the clamping members 19 facing each other, is arranged a distance bushing 22. The bushing 22, which is clamped between the inner ends of the conical clamping members 19 limits the compression force applied to the rubber rings 18 of the hinging arrangement 4.

The hinging arrangement of the suspension arm 5 is mounted as follows: In the attachment eye 15 of the suspension arm 5 are inserted the distance bushing 22 in the central bore 16 and the clamping members 19 with a rubber ring 18 vulcanized on their conical surface are inserted in each of the tapering bore portions 17. Adjustment brackets 23, which are know per se, e.g. from EP 943 529 are arranged on the side plates 12, 13 of the bearing bracket 3. Then the eye 15 of the suspension arm is inserted between the side plates 12, 13 of the bearing bracket 3. Next, the hinging bolt is inserted through the adjustment brackets, the side plates 12 and 13, the bores 20 of the clamping members 19, and through the bushing 22. This assembly is clamped together by means of tensioning the bolt 11 and nut 21 assembly.

The resilience of the rubber rings 18 provides a limited freedom of movement of the suspension arm in the rotational direction. Also a limited freedom in transverse direction, i.e. axial direction of the bolt 11 and directions perpendicular thereto is provided by the resilient ring 18. Tensioning the metal parts against each other by means of the bolt 11 and nut 21 biases the rubber ring 18 which thereby obtains a long duration of life.

Figure 7:
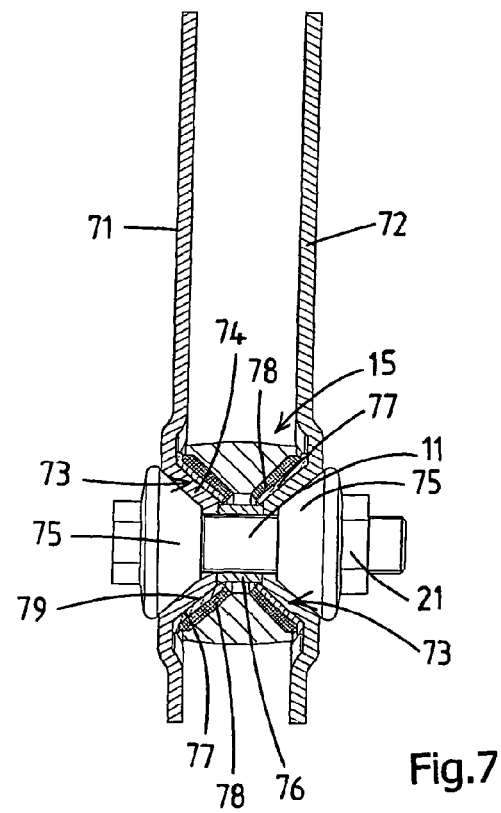
FIG. 7 shows a sectional view of another preferred embodiment of a hinging arrangement for a suspension arm according to the invention.

In FIG. 7 is shown an alternative embodiment of the hinging arrangement for the suspension arm 5. In this embodiment the attachment eye 15 at the front end portion of the suspension arm 5 is similar to the one described above. In this embodiment the bearing bracket has substantially parallel side plates 71, 72 in which inwardly projecting dents 73 are provided in the region around the holes for the hinging bolt 11. The holes for the hinging bolt are preferably slotted holes, such that the hinge bolt 11, and therewith the suspension arms for the axle can be aligned. The dents 73 have a tapering side wall 74. The inner side of the dent 73 is received in the tapering bore portion 17 of the eye 15. On the outer side of the dent 73 clamping members 75 are received. The clamping members 75 have basically a frusto-conical shape of which the conical surface bears against the tapering surface of the dent. A spacer bushing 76 is located between the inner ends of the opposing dents 73. On the inner side of the conical surface of the dents 73 is provided a dish shaped metal ring 77 on which a rubber ring 78 is vulcanized. The rubber ring 78 is bearing against the tapering surface of the tapering bore portion 17. The hinging bolt 11 passes through the clamping members 75, the side plates 71, 72, and the bushing 76. By tensioning the nut 21 on the bolt 11, the hinging arrangement is fixed.

Figure 8:
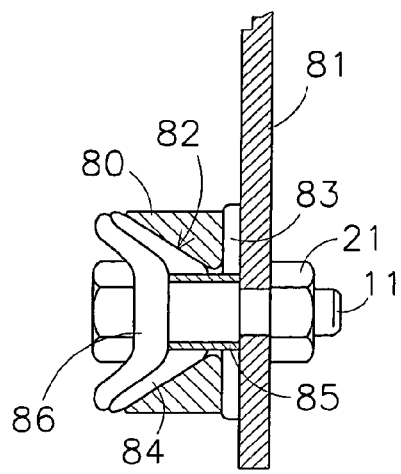
FIG. 8 shows a sectional view of another embodiment of a hinging arrangement according to the invention.

In FIG. 8 is shown a cross section through an asymetrical attachment eye 80 of a suspension arm. The eye 80 is attached to a bearing bracket comprising one single side plate 81. The eye comprises a conical bore 82 which tapers from the end remote from the side plate 81 towards the end near the side plate 81. Between the side of the eye facing the side plate 81 and the side plate 81 is located a flat rubber ring 83. In the tapering bore 82 is received a rubber ring 84. Furthermore is inserted in the bore 82 a spacer bushing 85 which bears with one end against the side plate 81 and a clamping member 86 with a conical outer surface and a bore for the shaft of a hinging bolt 11. The eye 80 of the suspension arm is clamped against the side plate 81 by means of the hinging bolt 11 and the nut 21. The rubber rings 83 and 84 provide some degree of freedom of movement in rotational direction around the central axis of the hinge bolt 11.

Figure 9A:
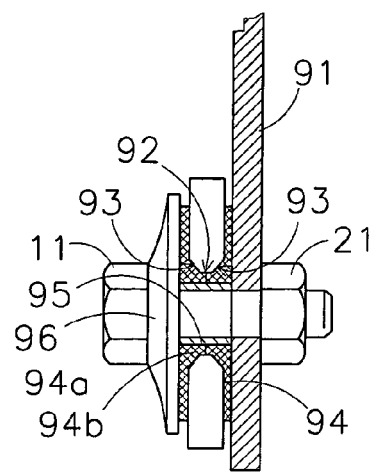
FIGS. 9A and 9B illustrate in a sectional view and a view in perspective respectively yet another embodiment of a hinging arrangement according to the invention.
Figure 9B:
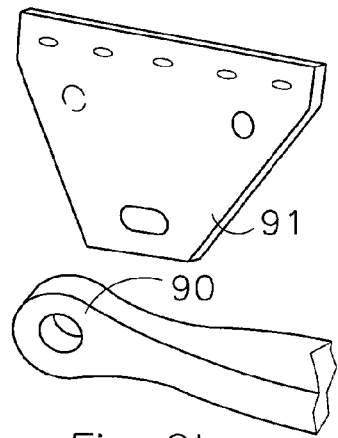

In FIG. 9A is shown a cross sectional view of a hinging arrangement according to the invention, wherein the bearing bracket comprises one single side plate 91. The attachment eye 90 of the suspension arm (cf. FIG. 9B) is symmetrical and has a relatively small width. It has a bore with a cylindrical central bore portion 92 and two opposing tapering bore portions 93. Two rubber rings 94 are inserted from opposite sides into the bore. The rubber rings 94 have a relatively flat base portion 94b and a frusto-conical portion 94a protruding from the base portion 94b. The frusto-conical portion 94a is received in the tapering bore portion 93 of the eye 90. The top sides of the frusto-conical portions 94a may abut each other in the central bore portion 92. The base portions 94b engage on the side surface of the eye 90.

A spacer bushing 95, preferably of metal, extends through the central holes of the rubber rings 94 and abuts with one end the side plate 91 of the bearing bracket. On the other end of the spacer bushing 95 engages a clamping member 96. The whole assembly is clamped together by the hinge bolt 11 cooperating with the nut 21.

It is also conceivable that the bearing brackets with one single side plate 81, 91 as shown in FIGS. 8 and 9 could be provided with a dent surrounding the, preferably slotted, hole for the hinging bolt 11, as is shown in FIG. 7.

Figure 10:
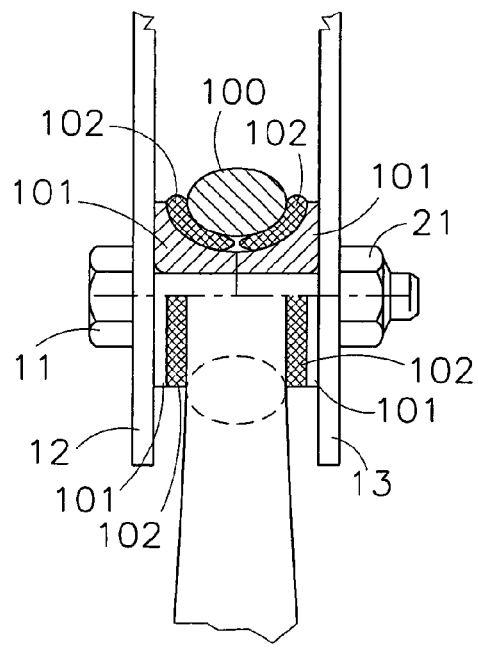
FIG. 10 shows still another embodiment of a hinging arrangement according to the invention.

In FIG. 10 is shown a partly sectional view, partly elevational view of a hinging arrangement according to the invention, wherein the attachment eye 100 has a circular cross section. The bore through the eye 100 thus has a tapering surface which narrows towards the center along a convex curve. The clamping members 101 have a curved outer surface and abut each other with their inner ends. Between each of the clamping members 101 and the tapring surface of the eye 100 is arranged a rubber ring 102. Said ring 102 has a thickness that increases from the radially inner side of the ring 102 towards the radially outer side.

Figure 11:
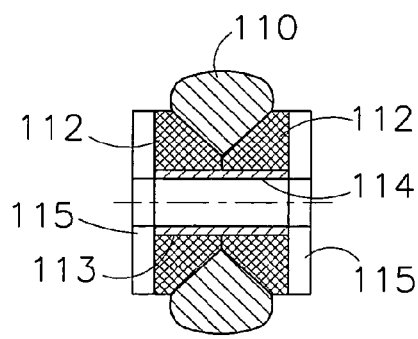
FIG. 11 shows another embodiment of a hinging arrangement according to the invention in particular suitable for a shock absorber.

In FIG. 11 is shown a cross sectional view of an attachment eye 110 with a drop shaped cross section. The bore through the eye 110 thus has two tapering opposing bore portions. In each of the tapering bore portions is inserted a rubber ring 112 with a frusto-conical shape. The rubber rings 112 abut each other at the center. The rubber rings 112 have a central passage 113 through which a spacer bushing of metal extends. On the outer end of each of the rubber rings 112 engages a clamping member 115 in this case configured as a metal ring. The assembly is clamped together in a similar way as described for the previously described embodiments by means of a bolt and a nut. This embodiment of FIG. 11 is particularly suitable, but not limited, for hingedly attaching a shock absorber of a vehicle suspension.

The invention claimed is:

1. A vehicle wheel axle suspension, comprising a longitudinal suspension arm to which a vehicle axle is fixed, a bearing bracket fixed to a vehicle chassis and an air spring bearing against the vehicle chassis, wherein the suspension arm, seen in a driving direction of the vehicle, on a rear end is attached to the air spring and on a front end is hingedly attached to the bearing bracket by means of a hinging arrangement, comprising an attachment eye integral to the suspension arm, and a hinge pin attached to the bearing bracket, which hinge pin is extending through the attachment eye,
   wherein the attachment eye has a bore for the hinge pin which comprises at least one tapering bore portion having a tapering bore portion, the hinging arrangement further comprising at least one resilient ring and a clamping member each provided with a central bore for the hinge pin, wherein, in the mounted state, the resilient ring is received at least partially within said tapering bore portion and bears with one side against the tapering surface of said tapering bore portion,
   wherein the bearing bracket comprises two substantially parallel side plates provided with holes for passing through the hinge pin, wherein the attachment eye of the suspension arm is located between said side plates such that the bore in the attachment eye and the holes in the side plates are brought in line,
   wherein in each of the side plates is formed an inwardly projecting dent, wherein inner sides of the dents are received in the respective tapering bore portion of the attachment eye, and wherein the clamping members are received in outer sides of the respective dents, said clamping member being forced against the outer side of the respective dent whereby the resilient ring is compressed between the dent and the tapering surface of the tapering bore portion,
   wherein on the inner side of the dent is arranged the resilient ring, which is made of rubber vulcanised on a dish-shaped metal ring, and
   wherein the metal ring is facing the side plate and the rubber is facing the tapering bore portion surface of the attachment eye.

2. The vehicle wheel axle suspension according to claim 1, wherein the attachment eye comprises a central bore portion and two opposing tapering bore portions, wherein the central bore portion connects the inner ends of the opposing tapering bore portions.

3. The vehicle wheel axle suspension according to claim 2, wherein in the central bore between the ends of the clamping members facing each other is arranged a spacer bushing.

4. The vehicle wheel axle suspension according to claim 1, wherein the tapering surface of the tapering bore portion is conical.

5. The vehicle wheel axle suspension according to claim 1, wherein the clamping member has a frusto-conical shape.

6. The vehicle wheel axle suspension according to claim 1, wherein the resilient ring has at the radially outer end a greater thickness than at the radially inner end.

7. The vehicle wheel axle suspension according to claim 1, wherein the suspension arm is manufactured by forging.

8. A vehicle wheel axle suspension, comprising a longitudinal suspension arm to which a vehicle axle is fixed, a bearing bracket fixed to a vehicle chassis and an air spring bearing against the vehicle chassis, wherein the suspension arm, seen in a driving direction of the vehicle, on its a rear end is attached to the air spring and on a front end is hingedly attached to the bearing bracket by means of a hinging arrangement, comprising an attachment eye integral to the suspension arm, and a hinge pin attached to the bearing bracket, which hinge pin is extending through the attachment eye,
   wherein the attachment eye has a bore for the hinge pin which comprises at least one tapering bore portion having a tapering bore portion, the hinging arrangement further comprising at least one resilient ring and a clamping member each provided with a central bore for the hinge pin, wherein, in the mounted state, the resilient ring is received at least partially within said tapering bore portion and bears with one side against the tapering surface of said tapering bore portion,
   wherein the bearing bracket comprises one single side plate provided with a hole for passing through the hinge pin wherein the attachment eye of the suspension arm is located against the side plate such that the bore in the attachment eye and the hole in the side plate are brought in line, and
   wherein in the side plate is formed an inwardly projecting dent, wherein an inner side of the dent is received in the tapering bore portion of the eye, and wherein the clamping member is received in an outer side of the dent, said clamping member being forced against the outer side of the dent whereby the resilient ring is compressed between the dent and the tapering bore portion surface,
   wherein on the inner side of the dent is arranged the resilient ring, which is made of rubber vulcanised on a dish-shaped metal ring, wherein the metal ring is facing the side plate and the rubber is facing the tapering bore portion surface of the attachment eye.

9. The vehicle wheel axle suspension according to claim 8, wherein the attachment eye comprises a central bore portion and two opposing tapering bore portions, wherein the central bore portion connects the inner ends of the opposing tapering bore portions.

10. The vehicle wheel axle suspension according to claim 8, wherein the tapering surface of the tapering bore portion is conical.

11. The vehicle wheel axle suspension according to claim 8, wherein the clamping member has a frusto-conical shape.

12. The New wheel axle suspension according to claim 8, wherein the diameter of the tapering bore portion is decreasing along a curve.

13. The vehicle wheel axle suspension according to claim 12, wherein the clamping member is spherical.

14. The vehicle wheel axle suspension according to claim 8, wherein the resilient ring has at the radially outer end a greater thickness than at the radially inner end.

15. The vehicle wheel axle suspension according to claim 9, wherein in the central bore between the ends of the clamping members facing each other is arranged a spacer bushing.

16. The vehicle wheel axle suspension according to claim 8, wherein the suspension arm is manufactured by forging.

\* \* \* \* \*